United States Patent
Ohmi

(10) Patent No.: US 6,314,072 B1
(45) Date of Patent: Nov. 6, 2001

(54) APPARATUS AND METHOD FOR FORMATTING AN OPTICAL DISK WITH FORMAT DATA WRITTEN TO THE OPTICAL DISK

(75) Inventor: Fumiya Ohmi, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/266,734

(22) Filed: Mar. 12, 1999

(30) Foreign Application Priority Data

Jul. 15, 1998 (JP) .................................................. 10-200992
Jan. 20, 1999 (JP) .................................................. 10-012188

(51) Int. Cl.⁷ ...................................................... G11B 7/00
(52) U.S. Cl. .................. 369/53.41; 369/53.1; 369/59.25
(58) Field of Search .................................. 369/47, 48, 49, 369/50, 54, 58, 59, 47.1, 47.15, 53.1, 53.11, 53.2, 53.41, 53.45, 59.1, 59.25

(56) References Cited

U.S. PATENT DOCUMENTS

5,315,567   5/1994  Fuji et al. .
5,896,355 * 4/1999  Sako et al. .............................. 369/58

FOREIGN PATENT DOCUMENTS

0 803 866   10/1997  (EP) .

* cited by examiner

Primary Examiner—Muhammad Edun
(74) Attorney, Agent, or Firm—Dickstein Shapiro Morin & Oshinsky LLP

(57) ABSTRACT

An optical-disk formatting apparatus includes an optical disk drive which formats a recordable optical disk by emitting a light beam to the optical disk. A format-data storing unit stores application-specific format data into a storage device. A format-data writing unit writes the application-specific format data, stored in the storage device, to the optical disk by controlling the optical disk drive after the formatting of the optical disk is normally complete.

10 Claims, 6 Drawing Sheets

APPARATUS AND METHOD FOR FORMATTING AN OPTICAL DISK WITH FORMAT DATA WRITTEN TO THE OPTICAL DISK

BACKGROUND OF THE INVENTION (1) Field of the Invention

The present invention relates to an apparatus and method for formatting a recordable optical disk with application-specific format data written to the recordable optical disk.

(2) Description of the Related Art

There are several types of compact disk which include a CD-R (compact disk-recordable), a CD-E (compact disk-erasable), and a CD-RW (compact disk-rewritable). Generally, in the CD-R, data can be written only one time, and in the CD-E and the CD-RW, data can be written many times. Hereinafter, these types of compact disk will be called a recordable optical disk.

A recordable optical disk, such as the CD-RW, which is made of a phase-change recording material, is known. In such an optical disk, a first protection layer, a recording layer, a second protection layer, and a reflection/heat-radiation layer are sequentially deposited on a substrate of a suitable resin material. These layers are produced, as laminated films on the substrate, through sputtering. A UV (ultraviolet ray) curing resin is coated onto the reflection/heat-radiation layer to form an overcoat layer.

In the above-mentioned optical disk, the recording layer is made of a phase-change recording material. When the phase-change recording material is heated and gradually cooled, the recording material is held in a crystalline status. On the other hand, when the phase-change recording material is melted and rapidly cooled, the recording material is in an amorphous status.

When information is recoded to the above-mentioned optical disk, an intensity of a light beam emitted to the recording layer is modulated in accordance with a record signal. The phase-change recording material of the recording layer is varied between the crystalline state and the amorphous state in a reversible manner by the light beam whose intensity is modulated by the record signal. A sequence of marked portions and non-marked portions are formed in the recording layer of the optical disk in accordance with the information recorded thereto. The marked portions on the optical disk are formed with the amorphous status of the phase-change recording material which is irradiated by the light having a high intensity. The non-marked portions on the optical disk are formed with the crystalline status of the phase-change recording material which is irradiated by the light having a low intensity.

After the recording layer is produced by using the sputtering, the phase-change recording material of the recording layer is in the amorphous status. In order to allow information to be rewritten to the above-mentioned optical disk, it is necessary to initialize or format the optical disk so that the entire recording layer is held in the crystalline status.

As for a magneto-optical disk, even if a defective sector is found in the magneto-optical disk during a formatting process, a primary defect list (PDL) indicating the location of the defective sector is prepared by a disk drive. The disk drive is able to have an error-corrective access to the magneto-optical disk by detecting the location of the defective sector from the PDL. A volume production of the magneto-optical disk which is formatted in this manner is possible.

However, regarding the recordable optical disk of the phase-change recording material mentioned above, an optical disk drive is unable to have an error-corrective access to the recordable optical disk by detecting the location of a defective sector from a PDL. An application program which is executed to control the optical disk drive is adapted to take an error-corrective measure against a recovery error, a read error or a write error. A determination as to whether the error-corrective process is to be performed, and a specific procedure to have an error-corrective access to the recordable optical disk depends on the application program. For this reason, it is difficult to achieve a volume production of the recordable optical disks which are formatted so as to be compatible with any of plural application programs.

SUMMARY OF THE INVENTION

An object of the present invention is to provide a novel and useful optical-disk formatting apparatus and method in which the above-described problems are eliminated.

Another object of the present invention is to provide an optical-disk formatting apparatus which is effective in achieving a volume production of the recordable optical disks which are formatted with application-specific format data written to the recordable optical disks.

Still another object of the present invention is to provide an optical-disk formatting method which is effective in achieving a volume production of the recordable optical disks which are formatted with application-specific format data written to the recordable optical disks.

The above-mentioned objects of the present invention are achieved by an optical-disk formatting apparatus including: an optical disk drive which formats a recordable optical disk by emitting a light beam to the optical disk; a format-data storing unit which stores application-specific format data into a storage device; and a format-data writing unit which writes the application-specific format data, stored in the storage device, to the optical disk by controlling the optical disk drive after the formatting of the optical disk is normally complete.

The above-mentioned objects of the present invention are achieved by an optical-disk formatting method including the steps of: storing application-specific format data into a storage device of an optical-disk formatting apparatus; formatting a recordable optical disk in an optical disk drive of the optical-disk formatting apparatus by emitting a light beam to the optical disk; and writing the application-specific format data, stored in the storage device, to the optical disk by controlling the optical disk drive after the formatting of the optical disk is normally complete.

According to the optical-disk formatting apparatus and method of the present invention, the application-specific format data, specific to a selected one of plural application programs with which the recordable optical disk is formatted to be compatible, is stored in the storage device. When executing an optical-disk formatting procedure, the format-data writing unit writes the application-specific format data, stored in the storage device, to the recordable optical disk by controlling the optical disk drive after the formatting of the recordable optical disk is normally complete. Hence, by repeating the optical-disk formatting procedure for each of plural recordable optical disks, it is possible to effectively achieve a volume production of the recordable optical disks which are formatted with the application-specific format data written to the recordable optical disks.

BRIEF DESCRIPTION OF THE DRAWINGS

Other objects, features and advantages of the present invention will become more apparent from the following detailed description when read in conjunction with the accompanying drawings in which.

DETAILED DESCRIPTION OF THE PREFERRED EMBODIMENTS

A description will now be given of the preferred embodiments of the present invention with reference to the accompanying drawings.

Figure 1:
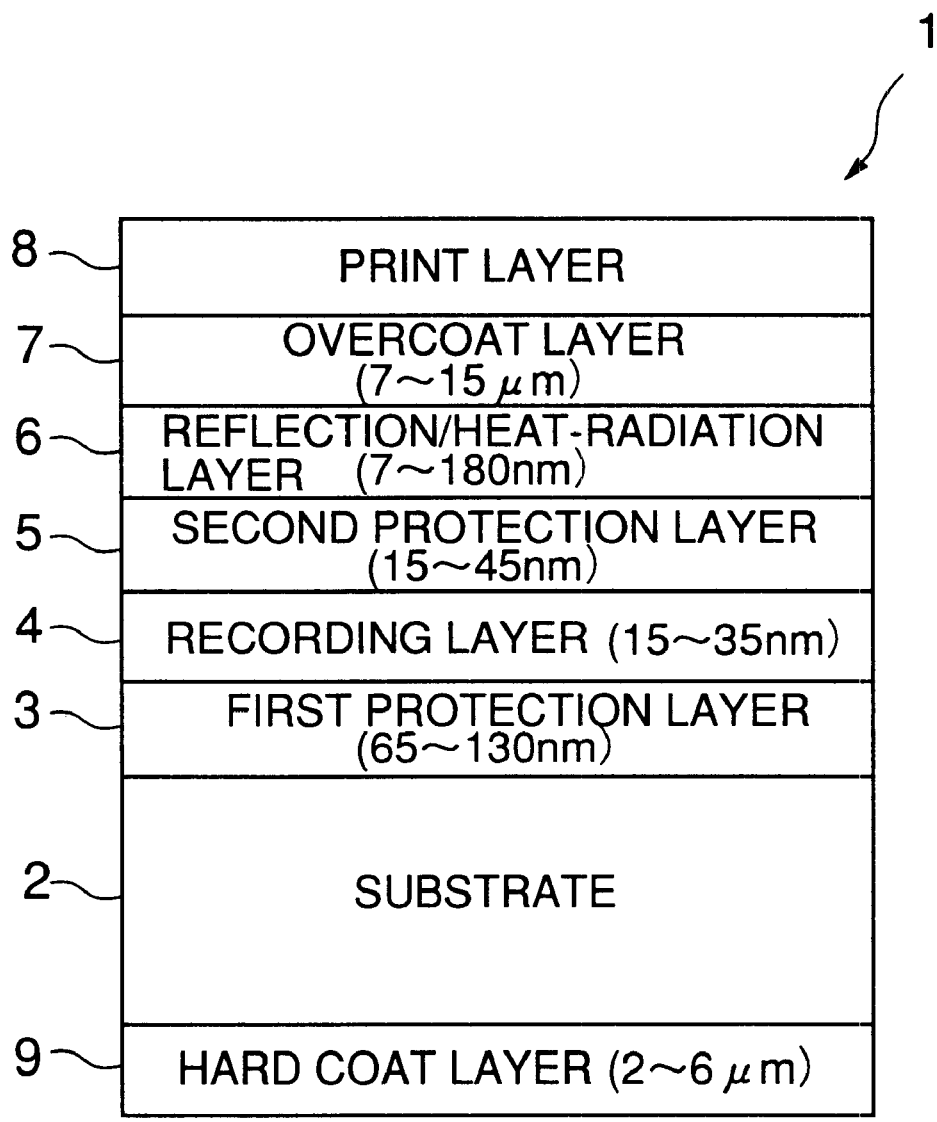
FIG. 1 is a diagram for explaining a laminated structure of a recordable optical disk.

FIG. 1 shows a laminated structure of a recordable optical disk 1.

As shown in FIG. 1, the recordable optical disk 1 includes multiple laminated layers deposited on a substrate 2, the laminated layers including a first protection layer 2, a recording layer 4, a second protection layer 5, a reflection/heat-radiation layer 6, a overcoat layer 7, and a print layer 8. A hard coat layer 9 is coated on a back surface of the substrate 2.

In the present embodiment, the substrate 2 is made of a polycarbonate resin or an acrylic resin. Such source materials of the substrate 2 are appropriate in view of the forming characteristics, the optical characteristics, and the cost. The substrate 2 may be provided in the shape or form of a disk, a card or a sheet. Preferably, the substrate 2 is 1.2 mm or 0.6 mm thick.

The first protection layer 3, the recording layer 4, the second protection layer 5, and the reflection/heat-radiation layer 6 are deposited on the substrate 2, and these layers are produced as films through sputtering. Preferably, the first protection layer 3, the recording layer 4, the second protection layer 5, and the reflection/heat-radiation layer 6 are 65–130 nm, 15–35 nm, 15–45 nm, and 7–180 nm thick, respectively.

The recording layer 4 is made of a phase-change recording material. When the phase-change recording material is heated and gradually cooled, the recording material is held in a crystalline status. When the phase-change recording material is melted and rapidly cooled, the recording material is in an amorphous status. After the recording layer 4 is produced by using the sputtering, the phase-change recording material of the recording layer 4 is in the amorphous status.

The overcoat layer 7 is coated onto the reflection/heat-radiation layer 6. Preferably, the overcoat layer 7 is 7–15 μm thick. The print layer 8 is produced onto the overcoat layer 7 after initialization of the recording layer 4.

The recordable optical disk 1 is prepared in the above-mentioned manner. The recordable optical disk 1 is placed in an optical disk drive, and the recording layer 4 is heated by a light beam, passing through the hard coat layer 9, incident on the substrate 2. When the recording layer 4 after heated is gradually cooled for a relatively long period, the phase-change recording material is held in the crystalline status. On the other hand, when the recording layer 4 after heated is rapidly cooled for a relatively short period, the phase-change recording material is in the amorphous status.

Figure 2:
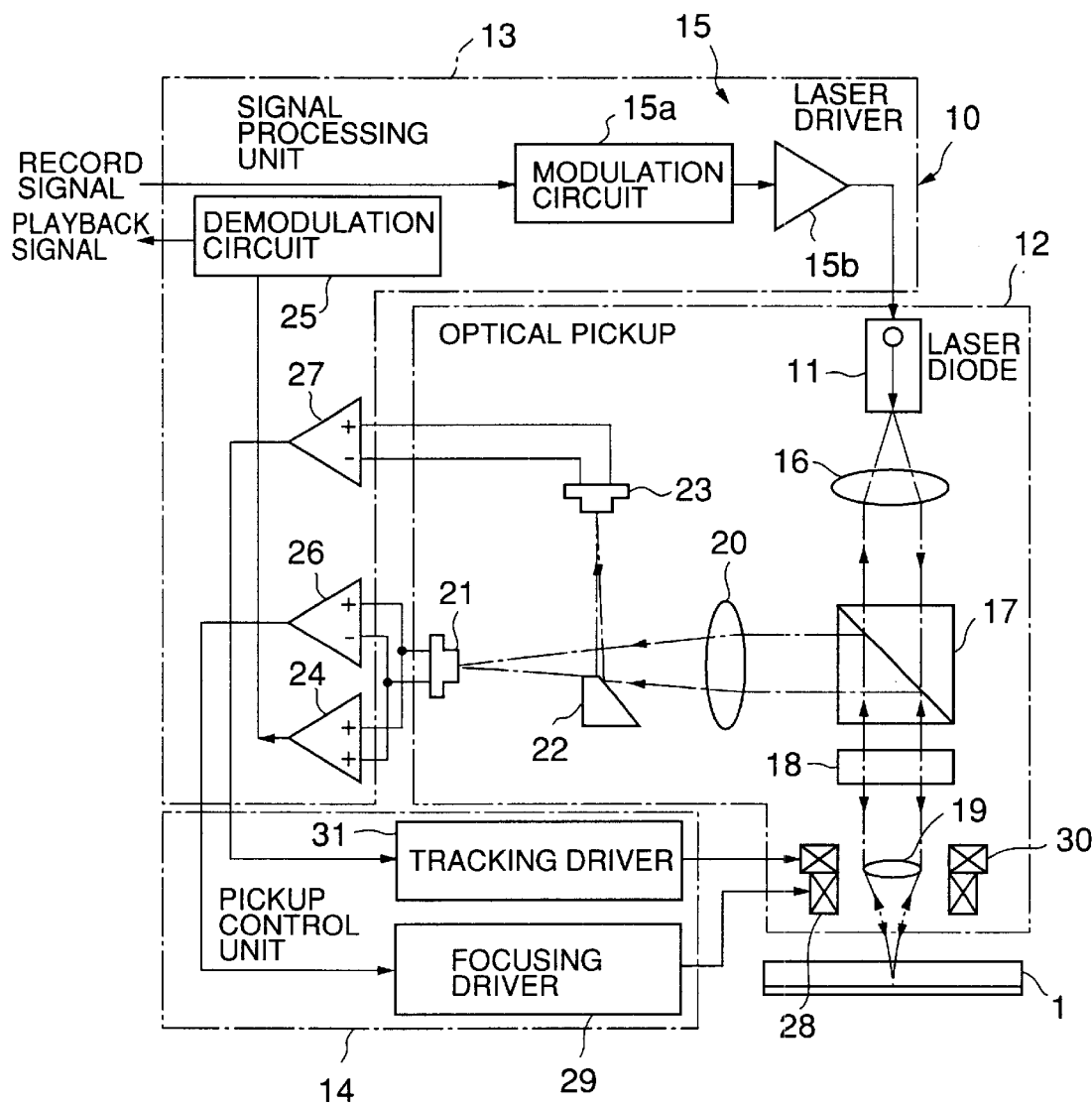
FIG. 2 is a block diagram of an optical-disk drive used by optical-disk formatting apparatus and method of the present invention.

FIG. 2 shows a configuration of an optical disk drive 10 used by optical-disk formatting apparatus and method of the present invention.

As shown in FIG. 2, the optical disk drive 10 generally has an optical pickup unit 12, a signal processing unit 13 which processes a recording signal input to and a playback signal output from the optical pickup unit 12, and a pickup control unit 14 which executes tracking and focusing servo of the optical pickup unit 12.

In the optical disk drive 10 of the present embodiment, the optical pickup 12 uses a laser diode (LD) 11 as a light source. The LD 11 emits a laser beam toward the recordable optical disk 1. The recording layer 4 of the recordable optical disk 1 is heated by the laser beam, passing through the hard coat layer 9, incident on the substrate 2. Alternatively, the optical pickup 12 may use another light source which emits an electron beam, an X-ray, an ultraviolet ray, a visible-light ray, an infrared ray, or a microwave ray, instead of the laser beam emitted by the LD 11. The LD 11 used by the optical pickup 12 is useful because the LD 11 is of a small size and the laser beam emitted by the LD 11 can be readily switched ON or OFF by controlling the power supplied to the LD 11.

Figure 3:
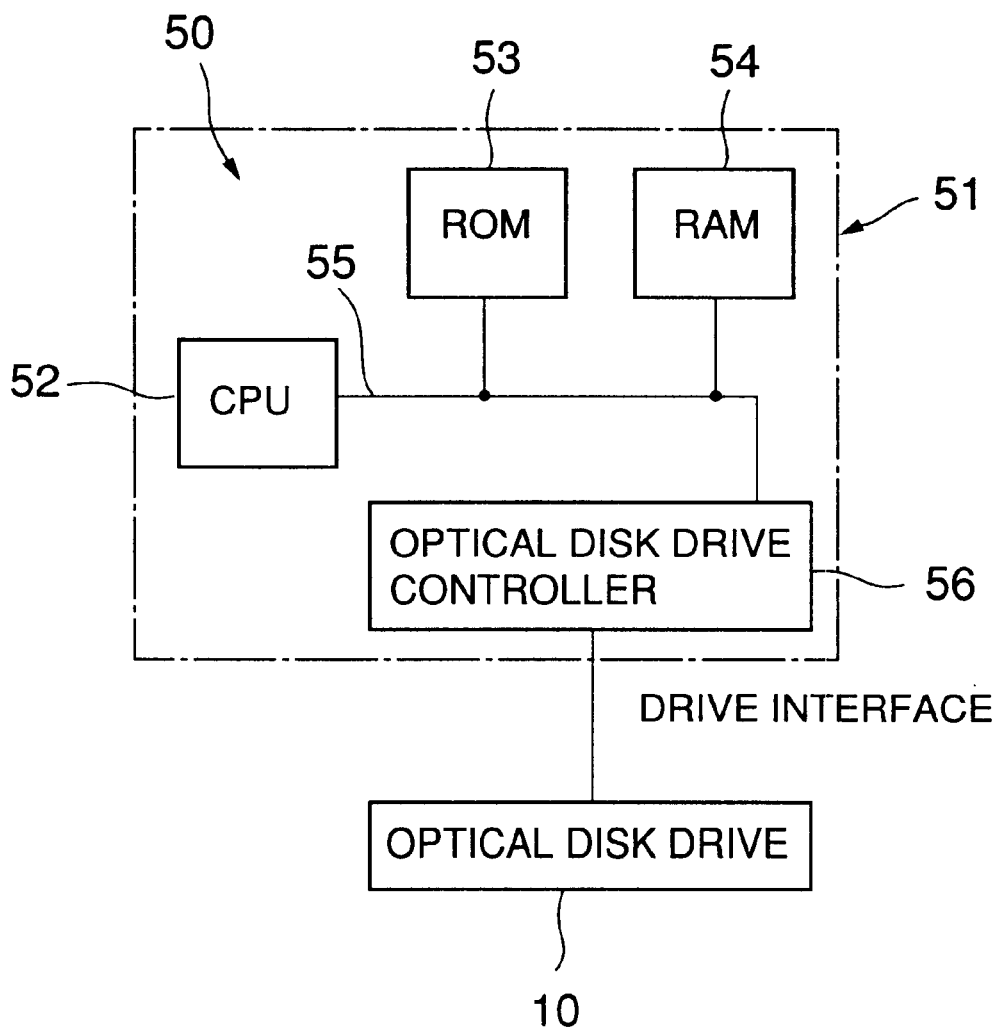
FIG. 3 is a block diagram of an embodiment of the optical-disk formatting apparatus of the present invention.

The optical disk drive 10 of the present embodiment is provided with a disk rotating device (not shown) and a disk moving device (not shown). The disk rotating device is controlled to rotate the recordable optical disk 1 around its central axis based on a control signal supplied by a microprocessor-based control unit 51 (which is shown in FIG. 3 and will be described later). The disk moving device is controlled to move the recordable optical disk 1 in a direction perpendicular to its central axis based on a control signal supplied by the control unit 51. A spot of the laser beam, emitted to the optical disk 1 by the LD 11, is moved in a radial direction of the optical disk 1 under the control of the disk rotating device and the disk moving device, so as to be focused on the optical disk 1.

In the signal processing unit 13 of FIG. 2, an LD power supply portion 15 is provided, and the LD power supply portion 15 controls the power, supplied to the LD 11, based on a record signal supplied to the signal processing unit 13 by the control unit 51 (shown in FIG. 3). The LD 11 is driven by the power supplied by the LD power supply portion 15 so that the laser beam emitted by the LD 11 is controlled.

In the signal processing unit 13 of FIG. 2, the LD power supply portion 15 includes a modulation circuit 15a which modulates a record signal supplied to the signal processing unit 13 by the control unit 51, and outputs the modulated record signal. The LD power supply portion 15 includes an amplifier 15b having an input connected to the modulation circuit 15a and an output connected to the LD 11. The amplifier 15b amplifies the modulated record signal output by the modulation circuit 15a, and supplies the power to the LD 11 based on the modulated record signal.

In the optical pickup 12 of FIG. 2, the LD 11 is driven by the power supplied by the LD power supply portion 15, and the laser beam emitted by the LD 11 is controlled in the above-mentioned manner. The laser beam emitted by the LD 11 is converted into a collimated emission beam by a collimator lens 16. The collimated emission beam from the collimator lens 16 is polarized by a polarization beam splitter 17. The polarized emission beam from the polarization beam splitter 17 is passed through a quarter-wave plate 18 to an objective lens 19. The emission beam, passed through the quarter-wave plate 18, is converted into a converging emission beam by the objective lens 19, and the converging emission beam from the objective lens 19 is focused on the recordable optical disk 1.

A reflection beam from the recordable optical disk 1 is passed through the objective lens 19 and the quarter-wave plate 18 to the polarization beam splitter 17. The reflection beam is polarized in a direction perpendicular to the optical path of the reflection beam by the polarization beam splitter 17, and the polarized reflection beam is passed through a condenser lens 20 to a first light-receiving part 21. The first light-receiving part 21 includes a two-division photodiode (PD) provided therein, and the first light-receiving part 21 converts the detected reflection beam from the recordable optical disk 1 into an electric signal.

In the optical disk drive 10 of FIG. 2, a tracking servo control utilizing a known push-pull method and a focusing servo control utilizing a known knife-edge method are executed by the pickup control unit 14. In the optical pickup 12, a knife edge 22 is arranged at an intermediate position in the optical path between the condenser lens 20 and the first light-receiving part 21. The reflection beam passed through the condenser lens 20 is partially reflected by the knife edge 22, and such reflection beam is directed to a second light-receiving part 23. The second light-receiving part 23 includes a two-division photodiode (PD) provided therein, and the second light-receiving part 23 converts the detected reflection beam from the recordable optical disk 1 into an electrical signal. The output signal of the second light-receiving part 23, indicating the reflection beam incident on the two-division photodiode of the second light-receiving part 23, is used to execute the tracking servo control.

In the signal processing unit 13 of FIG. 2, a playback-signal amplifier 24 and a demodulation circuit 25 are provided. The amplifier 24 has inputs connected to outputs of the first light-receiving part 21. The amplifier 24 has an output connected to an input of the demodulation circuit 25. The demodulation circuit 25 outputs a playback signal based on the outputs of the first light-receiving part 21. The playback signal output by the demodulation circuit 25 is supplied to the control unit 51.

In the signal processing unit 13 of FIG. 2, a focusing-error amplifier 26 and a tracking-error amplifier 27 are provided. The amplifier 26 has inputs connected to the outputs of the first light-receiving part 21. The amplifier 26 has an output connected to an input of a focusing driver 29 of the pickup control unit 14. When a focusing error occurs, the amplifier 26 outputs a focusing-error signal, indicating the focusing error, to the focusing driver 29 based on the outputs of the first light-receiving part 21. The amplifier 27 has inputs connected to outputs of the second light-receiving part 23. The amplifier 27 has an output connected to an input of a tracking driver 31 of the pickup control unit 14. When a tracking error occurs, the amplifier 27 outputs a tracking-error signal to the tracking driver 31 based on outputs of the second light-receiving part 23.

In the optical pickup 12 of FIG. 2, a focusing coil 28 and a tracking coil 30 are provided. In the pickup control unit 14 of FIG. 2, the focusing driver 29 outputs a drive signal to the focusing coil 28 based on the focusing-error signal supplied by the focusing-error amplifier 26. The focusing coil 28 actuates the objective lens 19 of the optical pickup 12 to be moved in accordance with the drive signal output by the focusing driver 29 in a direction to eliminate the focusing error. The tracking driver 31 outputs a drive signal to the tracking coil 30 based on the tracking-error signal supplied by the tracking-error amplifier 27. The tracking coil 30 actuates the objective lens 19 of the optical pickup 12 to be moved in accordance with the drive signal output by the tracking driver 31 in a direction to eliminate the tracking error.

FIG. 3 shows an embodiment of the optical-disk formatting apparatus of the present invention.

As shown in FIG. 3, the optical-disk formatting apparatus 50 of the present embodiment includes the control unit 51 and the optical disk drive 10. The optical disk drive 10 is the same as that shown in FIG. 2. The control unit 51 includes a CPU (central processing unit) 52, a ROM (read-only memory) 53, a RAM (random access memory) 54, and an optical disk drive controller 56. In the control unit 51, the CPU 52, the ROM 53, the RAM 54 and the optical disk drive controller 56 are interconnected by a bus 55.

In the control unit 51 of FIG. 3, the CPU 52 executes arithmetic and logic operations and controls the elements 53, 54 and 56 of the control unit 51 through the bus 55. The ROM 53 stores program code instructions and fixed data therein. The RAM 54 provides work areas for the CPU 52 when the program code instructions stored in the ROM 53 are executed by the CPU 52. The optical disk drive controller 56 is connected through a drive interface to the optical disk drive 10. In the present embodiment, the ROM 53 includes a flash memory area which functions as a storage device that stores data when the data is written to the flash memory area of the ROM 53.

In the optical-disk formatting apparatus of FIG. 3, the CPU 52 acts as a format-data storing unit which stores application-specific format data into the flash memory area of the ROM 53. The application-specific format data includes at least UDF data and file-layout data. The UDF data and the file-layout data are specific to a selected one of plural application programs with which the recordable optical disk 1 is formatted to be compatible. When executing the program code instructions of the ROM 53, the CPU 52 acts as a format-data writing unit which writes the application-specific format data, stored in the flash memory area of the ROM 53, to the recordable optical disk 1 by controlling the optical disk drive 10 through the optical disk drive controller 56 after the formatting of the recordable optical disk 1 is normally complete.

In the optical-disk formatting apparatus of FIG. 3, the CPU 52 controls the optical disk drive 10 through the optical disk drive controller 56 so that the optical disk drive 10 formats the optical disk 1 by emitting a laser beam to the optical disk 1.

Figure 4:
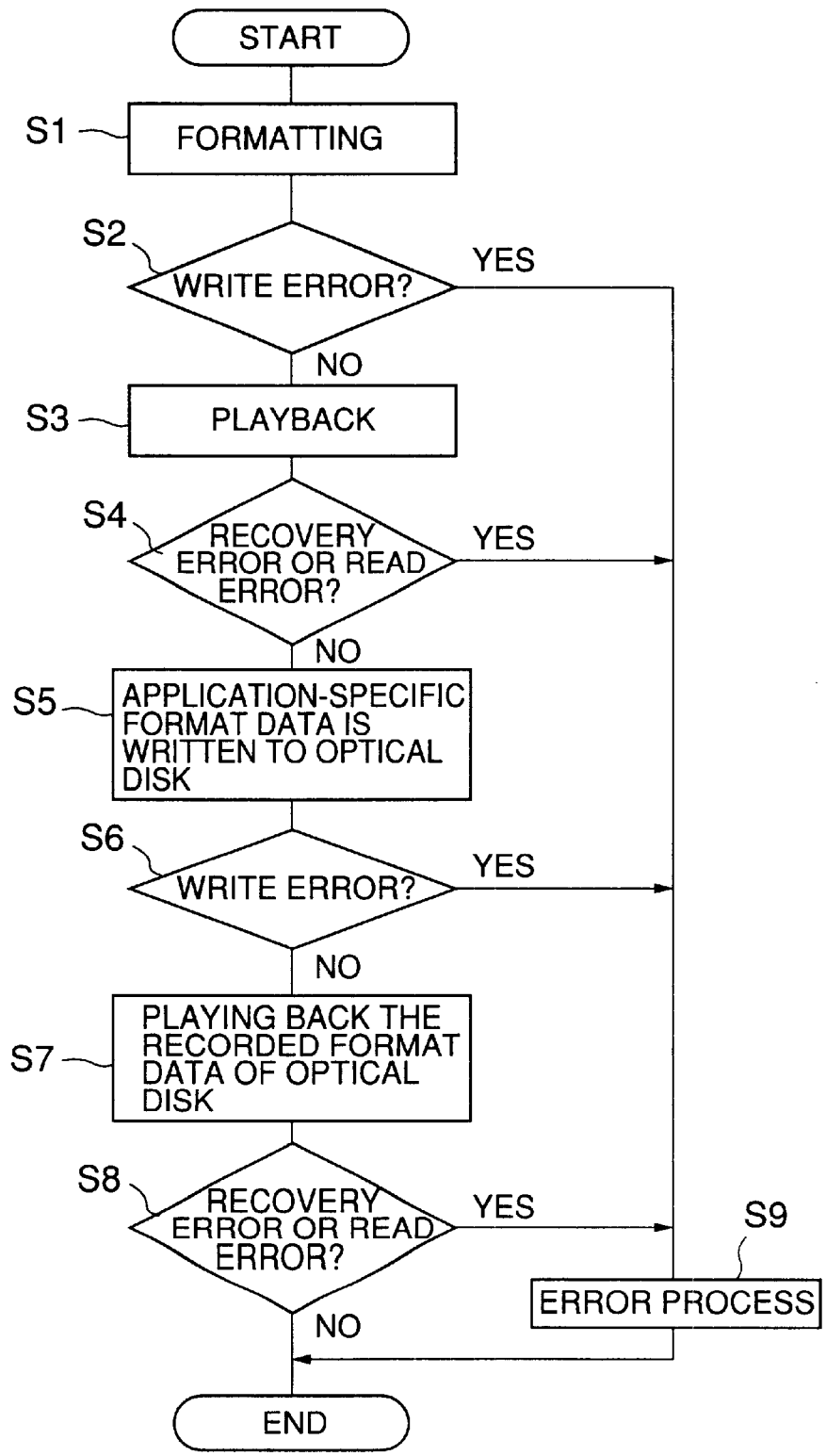
FIG. 4 is a flowchart for explaining an optical-disk formatting procedure executed by the optical-disk formatting apparatus of FIG. 3.

FIG. 4 shows an optical-disk formatting procedure executed by the CPU 52 of the optical-disk formatting apparatus of FIG. 3.

Suppose that the application-specific format data, specific to a selected one of plural application programs with which the optical disk 1 is formatted to be compatible, is stored in the flash memory area of the ROM 53 in the control unit 51.

As shown in FIG. 4, upon a start of the optical-disk formatting procedure, the CPU 52 at step Si controls the optical disk drive 10 through the optical disk drive controller 56 so that the recordable optical disk 1 is formatted.

The CPU 52 at step S2 determines whether a write error occurs during the formatting of the recordable optical disk 1 at the step S1.

When it is determined at the step S2 that the write error occurs, the CPU 52 at step S9 performs an error process. During the error process, for example, an indication of the occurrence of the error is output or displayed. After the error process is performed, the optical-disk formatting procedure of FIG. 4 is terminated.

When it is determined at the step S2 that the write error does not occur, the CPU 52 at step S3 controls the optical disk drive 10 through the optical disk drive controller 56 so that the initialized data of the recordable optical disk 1 is read or played back.

The CPU 52 at step S4 determines whether a recovery error or a read error occurs during the playback of the recordable optical disk 1 at the step S3.

When it is determined at the step S4 that such an error occurs, the CPU 52 performs the above step S9 (the error process). On the other hand, when it is determined at the step S4 that such an error does not occur, the CPU 52 at step S5 controls the optical disk drive 10 through the optical disk drive controller 56 so that the application-specific format data, stored in the flash memory area of the ROM 53, is written to the recordable optical disk 1.

The CPU 52 at step S6 determines whether a write error occurs during the writing of the stored format data to the recordable optical disk 1 at the step S5.

When it is determined at the step S6 that the write error occurs, the CPU 52 performs the above step S9 (the error process). On the other hand, when it is determined at the step S6 that the write error does not occur, the CPU 52 at step S7 controls the optical disk drive 10 through the optical disk drive controller 56 so that the recorded format data of the recordable optical disk 1 is read or played back.

The CPU 52 at step S8 determines whether a recovery error or a read error occurs during the playback of the recordable optical disk 1 at the step S7.

When it is determined at the step S8 that such an error occurs, the CPU 52 performs the above step S9 (the error process). On the other hand, when it is determined at the step S8 that such an error does not occur, the optical-disk formatting procedure of FIG. 4 is terminated.

In the above-described procedure, when it is determined that an error occurs, the CPU 52 at the step S9 may perform an error check process instead of performing the above-mentioned error process. During the error check process, an error code is compared with a predetermined reference value. When the error code does not match the reference value, the CPU 52 maintains to proceed to a next step following the step at which it is determined that the error occurs. On the other hand, when the error code matches with the reference value, the optical-disk formatting procedure of FIG. 4 is terminated.

According to the optical-disk formatting apparatus and method of the present embodiment, the application-specific format data, specific to a selected one of plural application programs with which the recordable optical disk 1 is formatted to be compatible, is stored in the flash memory area of the ROM 53. When executing the optical-disk formatting procedure of FIG. 4, the CPU 52 acts to write the application-specific format data, stored in the flash memory area of the ROM 53, to the recordable optical disk 1 by controlling the optical disk drive 10 through the optical disk drive controller 56 after the formatting of the recordable optical disk 1 is normally complete. Hence, by repeating the procedure of FIG. 4 for each of plural recordable optical disks, it is possible to effectively achieve a volume production of the recordable optical disks which are formatted with the application-specific format data written to the recordable optical disks.

Figure 5:
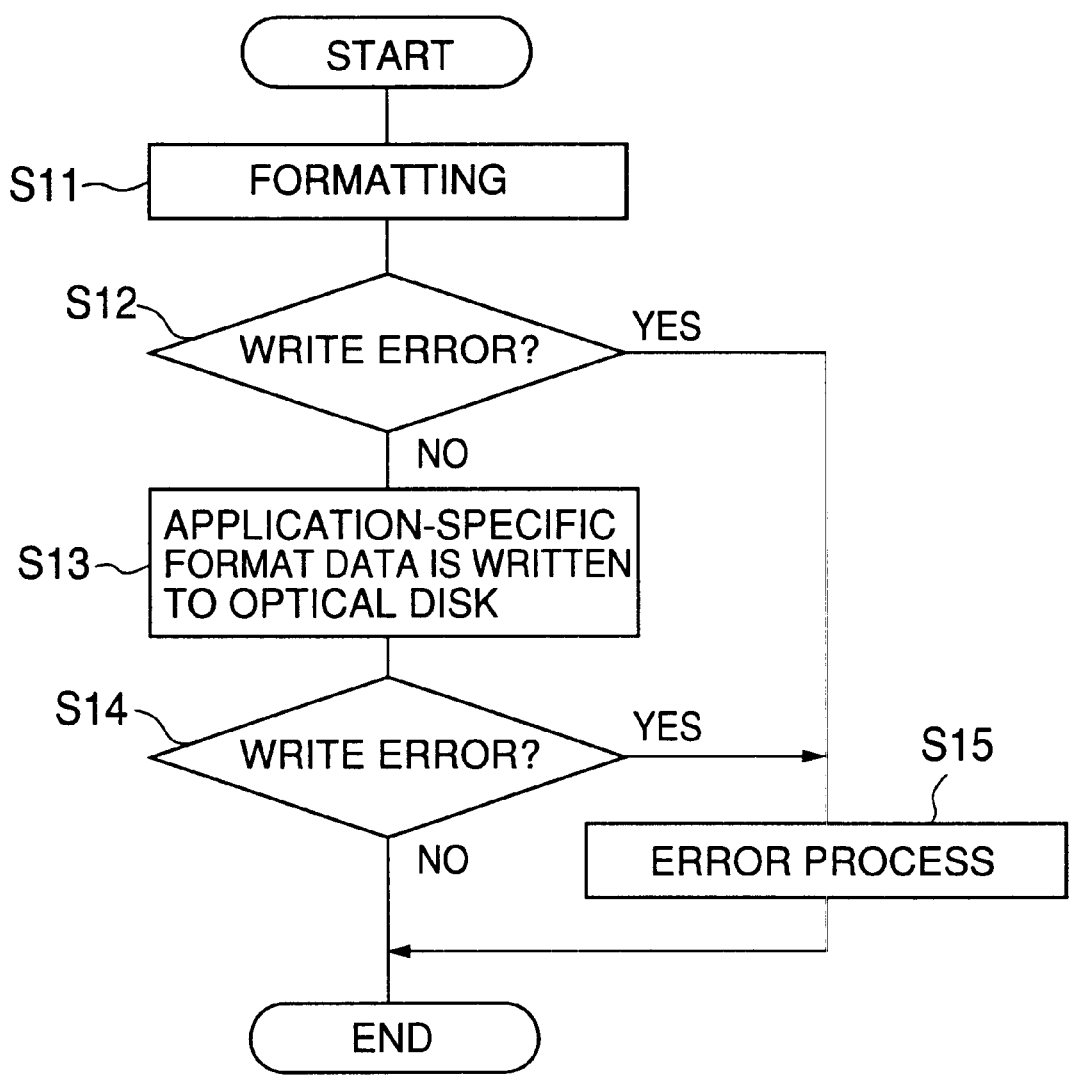
FIG. 5 is a flowchart for explaining another optical-disk formatting procedure executed by the optical-disk formatting apparatus of FIG. 3.

FIG. 5 shows another optical-disk formatting procedure executed by the CPU 52 of the optical-disk formatting apparatus of FIG. 3.

Suppose that the application-specific format data, specific to a selected one of plural application programs with which the optical disk 1 is formatted to be compatible, is stored in the flash memory area of the ROM 53 in the control unit 51.

As shown in FIG. 5, upon a start of the optical-disk formatting procedure, the CPU 52 at step S11 controls the optical disk drive 10 through the optical disk drive controller 56 so that the recordable optical disk 1 is formatted.

The CPU 52 at step S12 determines whether a write error occurs during the formatting of the recordable optical disk 1 at the step S11.

When it is determined at the step S12 that the write error occurs, the CPU 52 at step S15 performs an error process. During the error process, for example, an indication of the occurrence of the error is output or displayed. After the error process is performed, the optical-disk formatting procedure of FIG. 5 is terminated.

When it is determined at the step S12 that the write error does not occur, the CPU 52 at step S13 controls the optical disk drive 10 through the optical disk drive controller 56 so that the application-specific format data, stored in the flash memory area of the ROM 53, is written to the recordable optical disk 1.

The CPU 52 at step S14 determines whether a write error occurs during the writing of the stored format data to the recordable optical disk 1 at the step S13.

When it is determined at the step S14 that the write error occurs, the CPU 52 performs the above step S15 (the error process). On the other hand, when it is determined at the step S14 that the write error does not occur, the optical-disk formatting procedure of FIG. 5 is terminated.

In the above-described procedure, when it is determined at the step S12 that a write error occurs, the CPU 52 may perform an error check process instead of performing the above-mentioned error process. During the error check process, an error code is compared with a predetermined reference value. When the error code does not match the reference value, the CPU 52 maintains to proceed to a next step following the step S12 at which it is determined that the write error occurs. On the other hand, when the error code matches with the reference value, the optical-disk formatting procedure of FIG. 5 is terminated.

According to the optical-disk formatting apparatus and method of the present embodiment, the application-specific format data, specific to a selected one of plural application programs with which the recordable optical disk 1 is formatted to be compatible, is stored in the flash memory area of the ROM 53. When executing the optical-disk formatting procedure of FIG. 5, the CPU 52 acts to write the application-specific format data, stored in the flash memory area of the ROM 53, to the recordable optical disk 1 by controlling the optical disk drive 10 through the optical disk drive controller 56 after the formatting of the recordable optical disk 1 is normally complete. Hence, by repeating the procedure of FIG. 5 for each of plural recordable optical disks, it is possible to effectively achieve a volume production of the recordable optical disks which are formatted with the application-specific format data written to the recordable optical disks.

Figure 6:
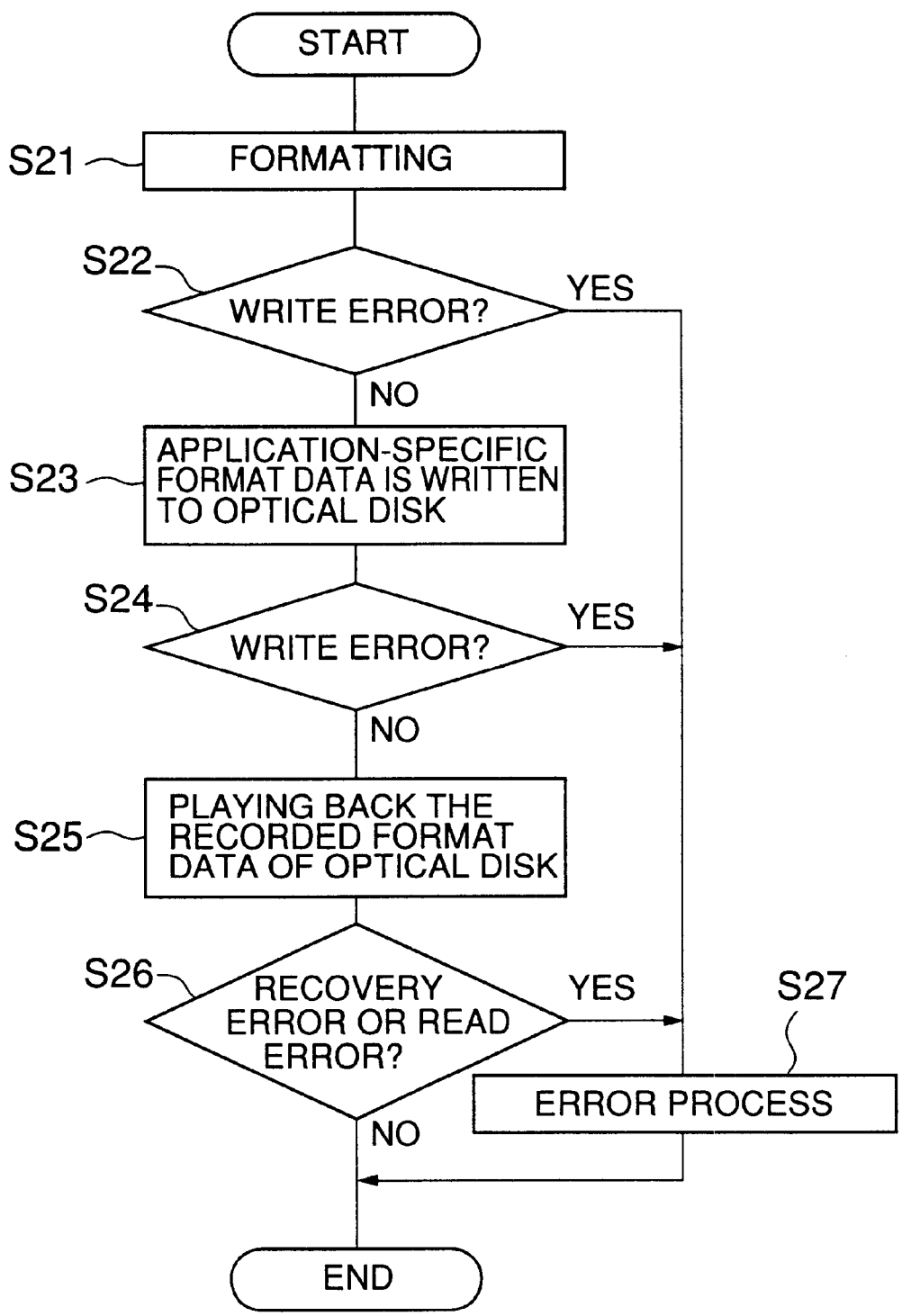
FIG. 6 is a flowchart for explaining a further optical-disk formatting procedure executed by the optical-disk formatting apparatus of FIG. 3.

FIG. 6 shows a further optical-disk formatting procedure executed by the optical-disk formatting apparatus of FIG. 3.

Suppose that the application-specific format data, specific to a selected one of plural application programs with which the optical disk 1 is formatted to be compatible, is stored in the flash memory area of the ROM 53 in the control unit 51.

As shown in FIG. 6, upon a start of the optical-disk formatting procedure, the CPU 52 at step S21 controls the optical disk drive 10 through the optical disk drive controller 56 so that the recordable optical disk 1 is formatted.

The CPU 52 at step S22 determines whether a write error occurs during the formatting of the recordable optical disk 1 at the step S21.

When it is determined at the step S22 that the write error occurs, the CPU 52 at step S27 performs an error process. During the error process, for example, an indication of the occurrence of the error is output or displayed. After the error process is performed, the optical-disk formatting procedure of FIG. 6 is terminated.

When it is determined at the step S22 that the write error does not occur, the CPU 52 at step S23 controls the optical disk drive 10 through the optical disk drive controller 56 so that the application-specific format data, stored in the flash memory area of the ROM 53, is written to the recordable optical disk 1.

The CPU 52 at step S24 determines whether a write error occurs during the writing of the stored format data to the recordable optical disk 1 at the step S23.

When it is determined at the step S24 that the write error occurs, the CPU 52 performs the above step S27 (the error process). On the other hand, when it is determined at the step S24 that the write error does not occur, the CPU 52 at step S25 controls the optical disk drive 10 through the optical disk drive controller 56 so that the recorded format data of the recordable optical disk 1 is read or played back.

The CPU 52 at step S26 determines whether a recovery error or a read error occurs during the playback of the recordable optical disk 1 at the step S25.

When it is determined at the step S26 that such an error occurs, the CPU 52 performs the above step S27 (the error process). On the other hand, when it is determined at the step S26 that such an error does not occur, the optical-disk formatting procedure of FIG. 6 is terminated.

In the above-described procedure, when it is determined that an error occurs, the CPU 52 may perform an error check process instead of performing the above-mentioned error process. During the error check process, an error code is compared with a predetermined reference value. When the error code does not match the reference value, the CPU 52 maintains to proceed to a next step following the step at which it is determined that the error occurs. On the other hand, when the error code matches with the reference value, the optical-disk formatting procedure of FIG. 6 is terminated.

According to the optical-disk formatting apparatus and method of the present embodiment, the application-specific format data, specific to a selected one of plural application programs with which the recordable optical disk 1 is formatted to be compatible, is stored in the flash memory area of the ROM 53. When executing the optical-disk formatting procedure of FIG. 6, the CPU 52 acts to write the application-specific format data, stored in the flash memory area of the ROM 53, to the recordable optical disk 1 by controlling the optical disk drive 10 through the optical disk drive controller 56 after the formatting of the recordable optical disk 1 is normally complete. Hence, by repeating the procedure of FIG. 6 for each of plural recordable optical disks, it is possible to effectively achieve a volume production of the recordable optical disks which are formatted with the application-specific format data written to the recordable optical disks.

Further, the present invention is not limited to the above-described embodiments, and variations and modifications may be made without departing from the scope of the present invention.

The present invention is based on Japanese priority application No. 10-200992, filed on Jul. 15, 1998, and Japanese priority application No. 11-012188, filed on Jan. 20, 1999, the entire contents of which are hereby incorporated by reference.

What is claimed is:

1. An optical-disk formatting apparatus comprising:
   an optical disk drive for formatting a recordable optical disk by emitting a light beam to the optical disk;
   a format-data storing unit for storing application-specific format data in a storage device, the application-specific format data comprising at least universal disk format data and file-layout data; and
   a format-data writing unit for writing the application-specific format data, stored in the storage device, to the optical disk by controlling the optical disk drive after completion of the formatting of the optical disk.

2. The apparatus according to claim 1, further comprising:
   a first error detection unit for determining whether a write error occurs when the format data is written to the optical disk; and
   a second error detection unit for determining whether a recovery error or a read error occurs when the written format data of the optical disk is read,
   wherein an execution of an optical-disk formatting procedure is terminated when at least one of the write error, the recovery error and the read error is determined as occurring.

3. The apparatus according to claim 2, further comprising an error process unit for providing, prior to the termination of the optical-disk formatting procedure, an indication of occurrence of an error when at least one of the write error, the recovery error and the read error is determined as occurring by either the first error detection unit or the second error detection unit.

4. The apparatus according to claim 1, further comprising an error checking unit for determining an error code matches with a predetermined reference value when an error occurs during the writing of the format data to the optical disk or during a reading of the written format data from the optical disk, wherein, when the error code does not match with the reference value, an execution of an optical-disk formatting procedure is maintained.

5. The apparatus according to claim 1, further comprising an error detection unit for determining whether a write error occurs when the format data is written to the optical disk, wherein an execution of an optical-disk formatting procedure is terminated when the write error is determined as occurring.

6. The apparatus according to claim 5, further comprising an error process unit for outputting, prior to the termination of the optical-disk formatting procedure, an indication of occurrence of the write error when the write error is determined as occurring by the error detection unit.

7. The apparatus according to claim 1, further comprising:
   an error detection unit for determining whether a write error occurs when the format data is written to the optical disk; and
   an error checking unit for determining an error code matches with a predetermined reference value when the write error occurs during the writing of the format data to the optical disk, wherein, when the error code does not match with the reference value, an execution of an optical-disk formatting procedure is maintained.

8. An optical-disk formatting method comprising the steps of:

storing application-specific format data in a storage device of an optical-disk formatting apparatus, the application-specific format data including a least universal disk format data and file-layout data;

formating a recordable optical disk in an optical disk drive of the optical-disk formating apparatus by emitting a light beam to the optical disk; and writing the application-specific format data, stored in the storage device, to the optical disk by controlling the optical disk drive after completion of the formating of the optical disk.

9. The method according to claim 8, further comprising the steps of:

determining whether a write error occurs when the format data is written to the optical disk; and determining whether a recovery error or a read error occurs when the written format data of the optical disk is read, wherein an execution of an optical-disk formatting procedure is terminated when at least one of the write error, the recovery error and the read error is determined as occurring.

10. The method according to claim 8, further comprising the step of determining an error code matches with a predetermined reference value when an error occurs during the writing of the format data to the optical disk or during a reading of the written format data from the optical disk, wherein, when the error code does not match with the reference value, an execution of an optical-disk formatting procedure is maintained.

* * * * *